CHARACTER GENERATION

Filed Nov. 16, 1959 2 Sheets-Sheet 1

INVENTOR

ALBERT M. LOSHIN

BY Cushman, Darby & Cushman

ATTORNEYS

INVENTOR
ALBERT M. LOSHIN
BY
Cushman, Darby & Cushman
ATTORNEYS

United States Patent Office 3,104,387 Patented Sept. 17, 1963

3,104,387
CHARACTER GENERATION

Albert M. Loshin, New York, N.Y., assignor to Skiatron Electronics & Television Corporation, New York, N.Y., a corporation of New York Filed Nov. 16, 1959, Ser. No. 853,092
3 Claims. (Cl. 340—324)

This invention relates to character generation equipment, and particularly to control circuitry therefor for controlling the deflections of a cathode ray beam so as to effect a predetermined raster trace and for specially controlling the intensity of such a beam to effect illumination on a cathode ray tube face of any one of a plurality of different characters.

Early in the use of high speed digital computers it became apparent that the language differences between man and computer posed a serious problem. Often the time saved by the use of a computer was dissipated trying to get information into the computer in a language understandable by the computer and out of the computer in a form easily comprehended by man. This was also true of many other types of open loop systems involving, for example, telemetry, radar, and instrumentation. This problem has been solved to a large degree by character presentation devices.

There are numerous types of digital and alphabetic display systems, and this invention particularly relates to the type which generates a character by a series of straight line segments. Briefly, in accordance with this invention, a basic generalized raster is developed on a cathode ray tube face by a pair of deflection signals. These signals in turn are developed by employing pulse generating means which provide pulses of substantially equal durations with substantially no delay between successive pulses. Certain of the pulses are collected and some of these are inverted to cause the deflection signal to move positively or negatively in accordance with whether a certain stroke of the raster is in a positive or negative direction. With a raster being so traced, the intensification of the cathode ray beam is especially controlled to effect generation of any one of the desired characters, by either blanking the beam during strokes which are not to be included in the character instantly being generated, or intensifying the otherwise unilluminating but desired character strokes.

Therefore, it is the primary object of this invention to provide improved control circuitry for character generation equipment.

It is a further object in conjunction with the preceding object to effect synchronization of predetermined strokes of a given basic raster with a special control of the intensification of the cathode ray beam tracing such raster.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figures 2, 3, 4, 5, 6:
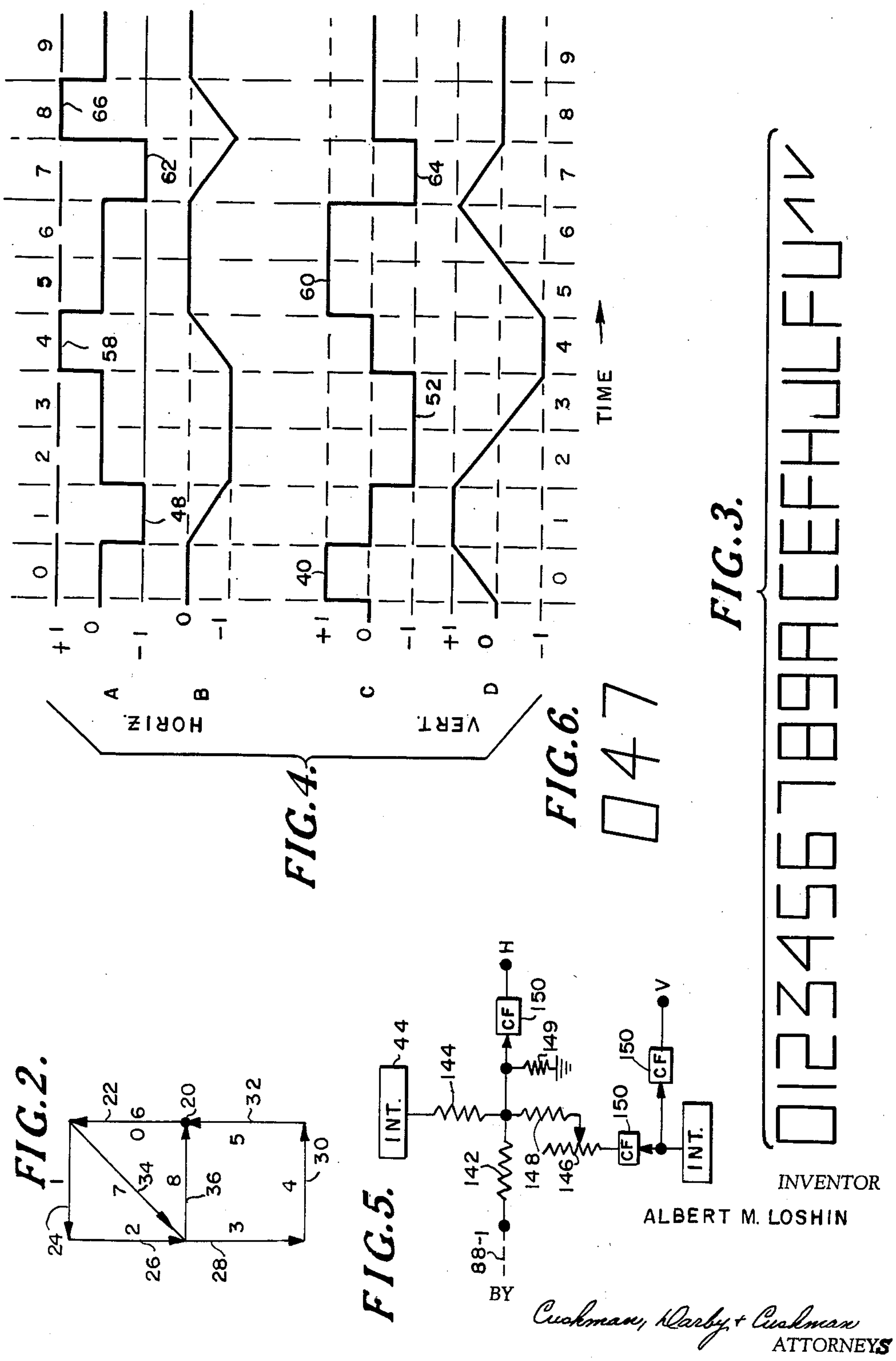
FIGURE 2 shows the strokes of a raster which may be formed by the circuitry of FIGURE 1.
FIGURE 3 depicts characters which may be formed from the raster of FIGURE 2.
FIGURE 4 illustrates waveforms which may be present at certain points in the circuitry of FIGURE 1.
FIGURE 5 illustrates a modification of the invention.

FIGURE 6 denotes exemplary slanted characters which may be effected by utilizing the FIGURE 5 circuitry to tilt the raster of FIGURE 2.

Figure 1:
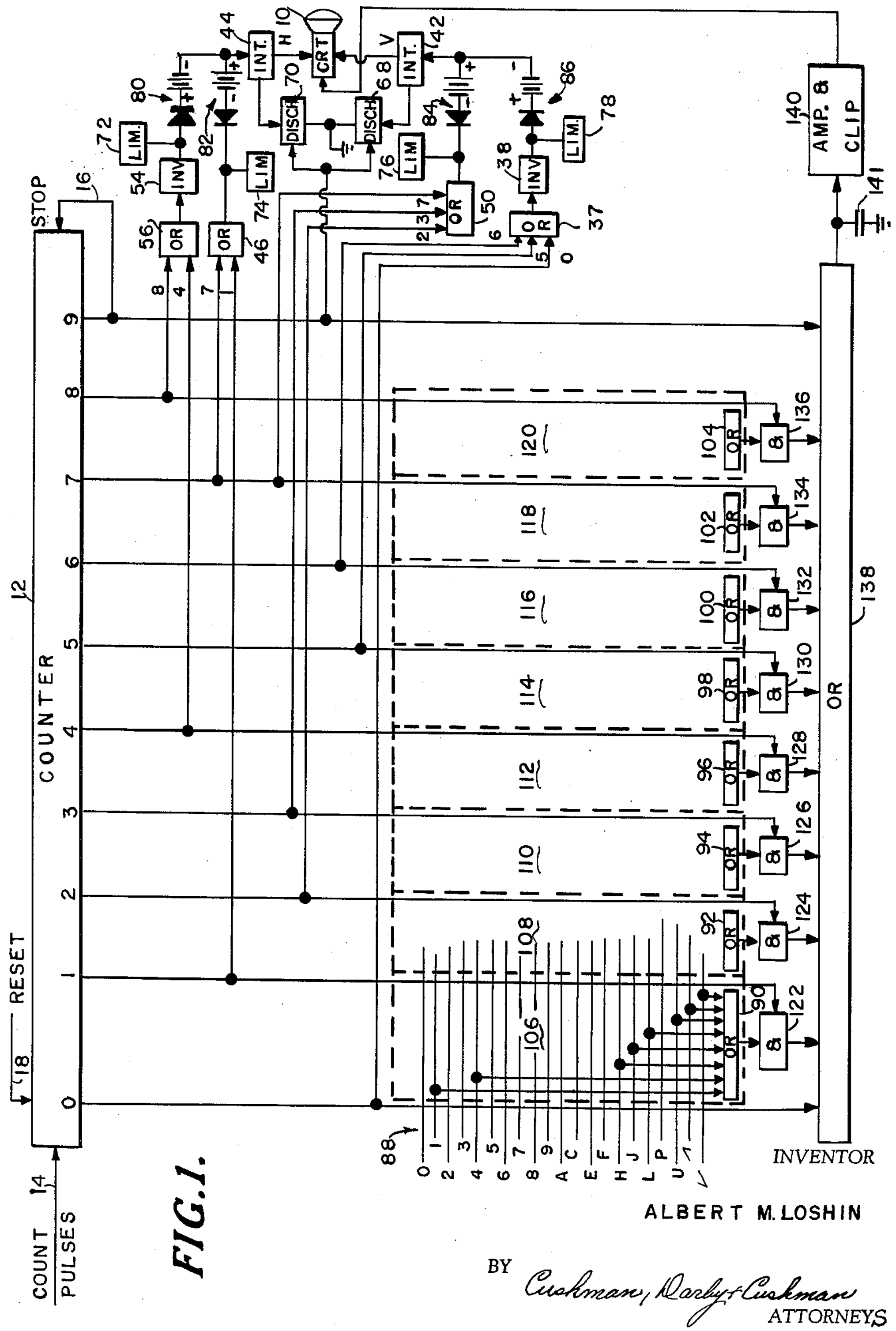
FIGURE 1 illustrates one embodiment of this invention.

The control circuit for synchronizing the generation of characters on the face of the cathode ray tube 10 in FIGURE 1 is effected by a pulse generator such as counter 12. For the particular embodiment herein described, counter 12 provides ten output pulses numbered "0" through "9." Therefore, the counter may be a conventional decade counter, though limitation thereto is not intended, since obviously other counters such as a ring counter may be employed. In conventional fashion, the counter steps along from one state to the next to provide successive output pulses respectively in response to successive count pulses as they are received on input line 14. As a representative example, it is assumed that the output pulses from counter 12 are negative pulses with any one such output pulse existing until the next output pulse begins, so as to cause very little if any delay between successive output pulses. As a matter of fact, there may be even some slight overlap between immediately successive output pulses. In any event, the "0" through "8" output pulses from the counter are substantially of equal length, while the "9" output pulse may also be of length equal to the other output pulses especially when the counter is cycled continuously, or alternatively, the "9" output pulse may be of indefinite length as can be provided by the connection of the "9" output pulse via line 16 back into the counter to cause it to stop counting input pulses received on line 14. When this happens, the counter can resume counting input pulses only after it has been reset in conventional manner by a signal on line 18. After such resetting, the next input pulse on line 14 provides a "0" output pulse, etc.

The substantially equal length output pulses are employed in a manner hereinafter described, to effect the raster shown in FIGURE 2. Each output pulse provides a unit step in the horizontal or vertical direction, or a unit step simultaneously in both the horizontal and vertical directions. The raster is traced stroke-by-stroke starting at the reference point 20. The first stroke 22 is upward and is herein termed a positive vertical stroke. As will be later apparent, this stroke is effected by the "0" output pulse from counter 12 in FIGURE 1. The "1" output pulse effects a leftward stroke 24 and this due to its direction is herein termed a negative horizontal stroke. Output pulses "2" and "3" sequentially effect negative vertical strokes 26 and 28, while the "4" output pulse effects the positive horizontal stroke 30. The next stroke 32 is a positive vertical stroke effected by the "5" output pulse. This returns the trace back to the raster starting point 20, but since it is desired to have the raster include a diagonal stroke 34 and horizontal stroke 36, stroke 22 is retraced by effect of the "6" output pulse, so that the "7" and "8" output pulses can respectively provide the strokes 34 and 36.

From the raster shown in FIGURE 2, all of the characters shown in FIGURE 3 may be generated. The numerals have obvious uses such as decimal representation of binary numbers, while the remaining characters, along with others which may be derived from the raster in FIGURE 2, if not to be by their normal meanings can be assigned predetermined meanings for representation of any symbol, for example as those employed in machine language between groups of numbers, etc.

To effect a trace of the cathode ray beam over a raster such as that shown in FIGURE 2, the beam must be deflected either horizontally or vertically or both at predetermined times. Since the first stroke 22 in FIGURE 2 is positive vertical, the negative "0" output pulse from counter 12 in FIGURE 1 is connected to inverter 38 via Or circuit 37. This effects a positive pulse 40 in FIGURE 4C. The output of this inverter is connected to an integrator 42 which integrates the positive pulse to provide to the cathode ray tube 10 the vertical deflection voltage as shown in FIGURE 4D during the "0" time period. Since there is to be no horizontal deflection during the "0" time period, the "0" output pulse from counter 12 is not coupled to the integrator 44 which provides the horizontal deflection voltage. Therefore the input to integrator 44 as shown in FIGURE 4A is of zero volts during the "0" time period, as is the output of integrator 44 as shown during that time period in FIGURE 4B.

To effect the horizontal negative stroke 24 in FIGURE 2, the "1" output pulse from counter 12 in FIGURE 1 is coupled to integrator 44 via Or circuit 46, but is not coupled at all to the vertical pulse integrator 42. Therefore, during the "1" time period, the input to the horizontal pulse integrator will be a negative pulse 48 with the resulting integration of that pulse being as shown in FIGURE 4B. No further input is received by the vertical pulse integrator 42, so the output of that integrator remains constant at the value attained thereby at the end of the "0" time period.

The next two strokes 26 and 28 in FIGURE 2 are vertical negative, and are effected by coupling the "2" and "3" negative output pulses to integrator 42 via Or circuit 50. Since these two pulses are combined in that Or circuit, they effectively appear to integrator 42 as a double length pulse 52 shown in FIGURE 4C. Upon receipt of this pulse, the integrator integrates same to effect the vertical deflection voltage shown in FIGURE 4A during the "2" and "3" time periods.

Following this, it is desired to effect the positive horizontal stroke 30 in FIGURE 2. Therefore, the "4" negative output pulse from counter 12 in FIGURE 1 is applied to inverter 54 through Or circuit 56. This effects the positive pulse 58 in FIGURE 4A, and integrator 44 provides the horizontal deflection voltage shown during the "4" time period of FIGURE 4B. For the positive vertical strokes 32 and 22, the "5" and "6" negative output pulses are coupled to Or circuit 37 after which they are inverted by inverter 38 to effect the double length pulse 60 shown in FIGURE 4C with integrator 42 providing in response thereto the vertical deflection voltage indicated during time periods "5" and "6" in FIGURE 4D.

The next stroke in FIGURE 2 is the diagonal stroke 34. Since this stroke has a leftward component and also a downward component of equal length, one unit step in the negative vertical direction and in the negative horizontal direction can accomplish this stroke. Therefore, the "7" negative output pulse from counter 12 is coupled to both the integrators 42 and 44 via Or circuits 50 and 46 respectively. That is, integrator 44 receives the negative pulse 62 in FIGURE 4A and integrator 42 receives the negative pulse 64 in FIGURE 4C. Each of the integrators integrates its respective pulse 62, 64, to provide the horizontal and vertical deflection voltages shown in time period "7" of FIGURES 4B and D.

For causing the positive horizontal stroke 36 in FIGURE 2, which stroke returns the trace to the starting point 20, the "8" output pulse from counter 12 in FIGURE 1 is coupled to Or circuit 56 and inverted to effect the positive pulse 66 shown in FIGURE 4A. The integration of this pulse by integrator 44 causes the beam to follow stroke 36 in the raster of FIGURE 2. However, particularly when the counter has been repeatedly operated, stroke 36 may not actually always end exactly on the reference point 20 due to drifting or the like which may result from some one or more strokes being slightly of improper length and/or direction and causing a cumulative drift problem. To compensate for this so as to re-establish the starting point at the reference potential corresponding to point 20 in FIGURE 2, the "9" output pulse is coupled to circuits 68 and 70 which in turn are respectively coupled to integrators 42 and 44. Each of the integrators may include its own condenser, and when such is the case, circuits 68 and 70 may be employed to discharge or clamp the condensers to a reference potential such as zero volts, when enabled by the "9" output pulse.

Preferably, the waveforms shown in FIGURE 4A and FIGURE 4C as presented to the respective integrators, are the result of the positive and negative pulses from the inverters and Or circuits being selectively regulated in maximum and minimum amplitude. For this purpose, the maximum amplitude of the pulses is controlled by limiters 72, 74, 76 and 78 while the minimum amplitudes are limited, as symbolically shown by the back-biased diode arrangements 80, 82, 84 and 86, which may also be considered as "clippers." This provides constant height pulses into the integrators for greater accuracy of the output deflection voltages generated thereby. Because the pulses are of unit length and unit height, integrators 42 and 44 may have a constant integration time constant.

The foregoing has described apparatus for causing a beam to be deflected in sequential strokes over a raster such as that shown in FIGURE 2. To form any of the characters indicated in FIGURE 3, it is necessary to specially control the intensity of the cathode ray beam. Two ways are provided to effect this special control of the beam. One is to blank out certain strokes of the beam so that those strokes will not be illuminated on the face of the cathode ray tube, the remaining illuminating strokes together representing one of the FIGURE 3 characters. The other way is to specially control an unilluminating beam in such a way that it is intensified during character making strokes sufficiently for causing illumination of only those strokes which effect one of the characters. FIGURE 1 particularly illustrates circuitry for specially controlling an illuminating cathode ray beam by blanking out certain strokes of each raster trace.

To accomplish this, a plurality of input lines 88 are employed and respectively assigned to represent the characters illustrated in FIGURE 4. That is, when any one of these lines is energized by an input pulse, the related character to which that line is assigned, will be illuminated on the face of the cathode ray tube when the counter provides a cycle of output pulses. Each of the input lines 88 is connected to one of the inputs of one or more of the Or circuits 90, 92, 94, 96, 98, 100, 102 and 104 via unique connections in the respective eight matrices 106, 108, 110, 112, 114, 116, 118 and 120. For example, the inputs the Or circuit 90 are respectively coupled to the 1, 4, H, J, L, U, inverted check mark, and check mark input lines 88. The outputs of the Or circuits 90—104 are respectively coupled as inputs to gates 122, 124, 126, 128, 130, 132, 134 and 136 which are respectively enabled by the "1" through "8" counter output pulses. In other words, any character input pulse on its respective line 88 is Anded with a counter output pulse. For an embodiment for producing signals for blanking certain strokes of the raster trace, the character pulses may be Anded with the counter pulses in accordance with the following table.

*Table I*

| Pulse for Character | Anded With Counter Pulses | |
|---|---|---|
| | Blanking | Intensification |
| 0 | 7, 8 | 1, 2, 3, 4, 5, 6 |
| 1 | 1, 2, 3, 4, 7, 8 | 5, 6 |
| 2 | 2, 5, 7 | 1, 3, 4, 6, 8 |
| 3 | 2, 3, 6 | 1, 4, 5, 7, 8 |
| 4 | 1, 2, 3, 4 | 5, 6, 7, 8 |
| 5 | 3, 6, 7 | 1, 2, 4, 5, 8 |
| 6 | 6, 7 | 1, 2, 3, 4, 5, 8 |
| 7 | 2, 3, 4, 7, 8 | 1, 5, 6 |
| 8 | 7 | 1, 2, 3, 4, 5, 6, 8 |
| 9 | 3, 7 | 1, 2, 4, 5, 6, 8 |
| A | 4, 7 | 1, 2, 3, 5, 6, 8 |
| C | 5, 6, 7, 8 | 1, 2, 3, 4 |
| E | 5, 6, 7 | 1, 2, 3, 4, 8 |
| F | 4, 5, 6, 7 | 1, 2, 3, 8 |
| H | 1, 4, 7 | 2, 3, 5, 6, 8 |
| J | 1, 2, 7, 8 | 3, 4, 5, 6 |
| L | 1, 5, 6, 7, 8 | 2, 3, 4 |
| P | 4, 5, 7 | 1, 2, 3, 6, 8 |
| U | 1, 7, 8 | 2, 3, 4, 5, 6 |
| ^ | 1, 2, 3, 4, 5, 8 | 6, 7 |
| √ | 1, 3, 4, 5, 6, 8 | 2, 7 |

In the above table, there is a column headed "Blanking" and another column headed "Intensification." In the blanking embodiment, the character pulse which occurs on one of lines 88 is Anded with the pulses listed under the Blanking column but is not Anded with any of the counter output pulses listed under the Intensification column. It may be noted that the pulses for any given character under the Blanking column are the complement of those under the Intensification column, and vice versa. This table indicates, therefore, the matrix connection for both a blanking embodiment and an intensification embodiment, the only difference between the two embodiments as far as the matrix connections are concerned, being that the connections of one embodiment are the complement of the other.

With reference again to FIGURE 1, it will be noted that all of the And gate outputs are applied as inputs to Or circuit 138. For the blanking embodiment shown in FIGURE 1, the "0" and "9" counter output pulses are also applied as inputs to that Or circuit. As will be later indicated more fully, these two inputs are not utilized in an intensification embodiment. The output of Or circuit 138 may be, after any desired amplification or clipping in circuit 140, applied to the beam intensity control input of cathode ray tube oscilloscope 10. Since FIGURE 1 is a blanking embodiment, the cathode ray beam intensification is specially controlled by the output of Or circuit 138 to effect blanking of those raster strokes which are not part of the character represented by an instantly energized input line.

Whenever there is any possibility of even slight spacing between immediately successive counter output pulses, it is preferable to include an integrating or holding condenser 141 across the output of Or circuit 138 to prevent any momentary substantial change of that output due to the lack of any output pulse while the counter is changing states. This prevents intensity dots at stroke ends in the blanking embodiment, and prevents any possible spacing between time consecutive strokes in the intensification embodiment.

For an embodiment wherein the normal intensity of the beam is such as not to cause illumination of any raster stroke during its trace thereover, the FIGURE 1 circuitry may be changed to effect the matrix connections indicated under the Intensification column in the table above with the deletion of the "0" and "9" counter output pulses to the extent of their application to Or circuit 138. These pulses are not needed to aid in specially controlling the cathode ray beam intensity in the intensification embodiment since neither of the pulses need be employed to effect an illumination of a raster stroke, whereas in the blanking embodiment, it is desirable to blank the "0" stroke of the raster and also to blank out the dot which may be caused by the "9" output pulse.

In both the blanking and intensification embodiments, it will be noted that the "0" output pulse is not employed to effect the illumination of any part of any character. This is done because the same stroke is retraced during the "6" output pulse period, and it is preferred to have illumination of this stroke of the raster occur during the middle of the whole raster trace rather than at the beginning thereof for greater reliability purposes. However, it is to be understood that the role of the "0" and "6" counter output pulses may be interchanged in either the blanking or intensification embodiment.

Reference to the above table will indicate that the character generation of the number one (1) is caused by the illumination of strokes 32 and 22 of FIGURE 2, the latter either in response to the "0" or "6" output pulse. It is of course apparent that this same number could be generated by illumination of strokes 26 and 28. Since this number in either case will appear on a side of the raster, obviously the number will not be horizontally centered in the raster, though the other characters in FIGURE 3 will be so centered. To shift the character "1" toward the center of the raster, the horizontal deflection voltage as received from integrator 44 may be modified slightly by connection of the character "1" input line 88 thereto via a resistor. This is illustrated in FIGURE 5 wherein the resistor 142 is employed to mix a part of that character's input signal with the output of integrator 44 as present across resistor 144. This may be done in either the blanking or intensification embodiment to center the character "1" on the raster.

Although the characters as illustrated in FIGURE 3 make a good presentation of themselves even though their up-down lines are absolutely vertically disposed, it may be desirable in certain instances to "stylize" the characters further by providing a slant or "tilt" to their presentation to effect a script-like look, such as shown for the three exemplary characters in FIGURE 6. If this is desired, it may be accomplished by mixing a part of the vertical deflection voltage in with the horizontal deflection voltage to cause the latter to become a function of the former. In FIGURE 5, this is effected by selecting a portion of the vertical deflection voltage with rheostat 146 and mixing it with the horizontal deflection voltage via resistor 148.

Cathode followers 150 or other buffers may be used to prevent interaction of the resultant horizontal deflection voltage with the vertical deflection voltage output and to provide the vertical and horizontal outputs with suitable impedances.

Although a specific raster has been shown and described, other raster patterns can be derived in a manner similar to the way above described with more or less strokes and a corresponding number of counter output pulses which may be of different lengths according to the stroke length desired. In addition, one or more "dwell" points may be provided in the raster between two adjacent strokes by not feeding corresponding counter pulses to either of the integrators while intensification during those pulse periods forms an intensity dot.

In the above description of FIGURE 1, the input lines 88 are variously connected to different Or circuits 90—104 the outputs of which are gated by the counter output pulses. Alternatively, the counter outputs utilized for particular characters could be collected by Or circuits and gated by a respective input line signal.

Combined logic may be employed to reduce the number of gating components at the expense of additional circuitry varieties, as one of ordinary skill in the art may derive.

Thus it is apparent that there is provided by this invention circuitry in which the various objects and advantages herein set forth are successfully achieved.

Modifications of this invention now described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. In character generation equipment of the type in which a cathode ray beam is controlled to trace a predetermined raster, a counter having ten output lines for respectively providing ten substantially equal length output pulses successively with substantially no delay between successive pulses, said output lines and pulses being numbered "0" through "9" in accordance with the time sequence of the output pulses, each of such output pulses having a time period corresponding to the time a different given stroke in said raster is to be traced, any horizontal raster stroke being positive or negative according to whether it is to be traced rightwardly or leftwardly and any vertical raster stroke being positive or negative according to whether it is to be traced upwardly or downwardly, a first Or circuit having inputs coupled to the "4" and "8" output pulse lines, a second Or circuit having inputs coupled to the "1" and "7" output pulse lines, means for combining the outputs of said Or circuits including means for inverting the output of one of the Or circuits to effect a first waveform including positive and negative pulses corresponding to said horizontal positive and negative strokes, means for integrating said first waveform for controlling the horizontal deflection of said cathode ray beam, a third Or circuit having inputs coupled to the "0", "5" and "6" output pulse lines, a fourth Or circuit having inputs coupled to the "2", "3" and "7" output pulse lines, means for combining the outputs of said third and fourth Or circuits including means for inverting the output of one of the third and fourth Or circuits to form a second waveform having positive and negative pulses corresponding to said vertical positive and negative strokes, means for integrating the said second waveform for controlling the vertical deflection of said cathode ray beam, a plurality of input lines respectively corresponding to any one of a plurality of different characters to be generated when energized by a respective input signal, a plurality of other Or circuits one for each of said "1" through "8" output signals, each of said other Or circuits having its own respective plurality of inputs coupled respectively to assigned ones of said input lines with the coupling of the inputs of each other Or circuit being different than any other such other Or circuit, one gate per other Or circuit for respectively gating out the outputs of the other Or circuits, means coupling the "1" through "8" output lines respectively to said gates for enabling same by the respective output pulses, another Or circuit having inputs coupled to the outputs of said gates for producing an output signal for specially controlling the intensity of the cathode ray beam during the pulse time periods in which the beam needs to be specially controlled to effect illumination during the beam movement over said raster of the character instantly represented by the energization of a given input line, and means coupled to the "9" output pulse line for returning the voltage output of each of said integrating means to a given reference potential.

2. Apparatus as in claim 1 and further including means for coupling the "0" and "9" output pulse lines to said another Or circuit.

3. Apparatus as in claim 1 wherein one of the characters to be illuminated by movement of the beam over said raster is the number one, and further including means coupled between the output of the horizontal deflection integrating means and the input line assigned to the number one for shifting the illumination of that number from a side of the raster toward the center thereof.

References Cited in the file of this patent

UNITED STATES PATENTS

| | | |
|---|---|---|
| 2,766,444 | Sheftelman | Oct. 9, 1956 |
| 2,784,251 | Young et al. | Mar. 5, 1957 |
| 2,875,951 | Schreiner | Mar. 3, 1959 |
| 2,920,312 | Gordon et al. | Jan. 5, 1960 |
| 2,931,022 | Triest | Mar. 29, 1960 |
| 2,942,251 | Shanahan | June 21, 1960 |